(12) United States Patent
Frees

(10) Patent No.: US 6,567,231 B1
(45) Date of Patent: May 20, 2003

(54) VIBRATION MODE COMPENSATION FOR DISK DRIVE

(75) Inventor: Gregory Michael Frees, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,864

(22) Filed: Oct. 29, 1999

(51) Int. Cl.[7] .............................................. G11B 21/02
(52) U.S. Cl. ...................... 360/75; 360/78.09
(58) Field of Search ................ 360/75, 78.09, 360/78.12; 318/560–561

(56) References Cited

U.S. PATENT DOCUMENTS

| | | | |
|---|---|---|---|
| 4,697,127 A | * 9/1987 | Stich et al. .................. 318/561 |
| 5,455,730 A | 10/1995 | Dovek et al. ................ 360/113 |
| 5,729,397 A | * 3/1998 | Ottesen et al. ................ 360/53 |
| 5,739,972 A | 4/1998 | Smith et al. .............. 360/77.03 |
| 5,777,815 A | 7/1998 | Kasiraj et al. ................. 360/75 |
| 5,977,737 A | * 11/1999 | Labriola, II .................. 318/560 |
| 6,392,833 B1 | * 5/2002 | Wood et al. ................... 360/69 |

* cited by examiner

Primary Examiner—David Hudspeth
Assistant Examiner—K. Wong
(74) Attorney, Agent, or Firm—Robert B. Martin; Bracewell & Patterson, L.L.P.

(57) ABSTRACT

The fundamental vibration or butterfly mode sensitivity of a hard disk drive,is significantly dependent on the operating temperature of the drive. The temperature of the drive is readily determined via measurement with a thermal or coil resistance sensor. The sensor provides the drive's servo controller with the drive temperature. The current operating temperature of the disk drive, in combination with its modal sensitivity to thermal changes, are used to regularly update the servo controller. With this information, the servo controller calculates new butterfly mode characteristics as the operating temperature changes in order to actively compensate for the mode, and thus increase the performance of the disk drive.

14 Claims, 2 Drawing Sheets

Fig. 3
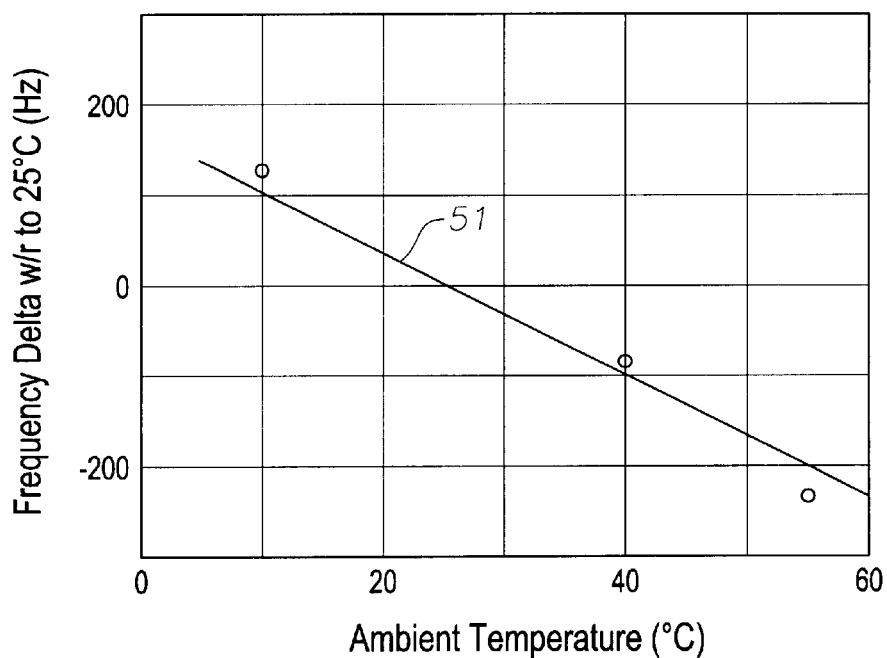
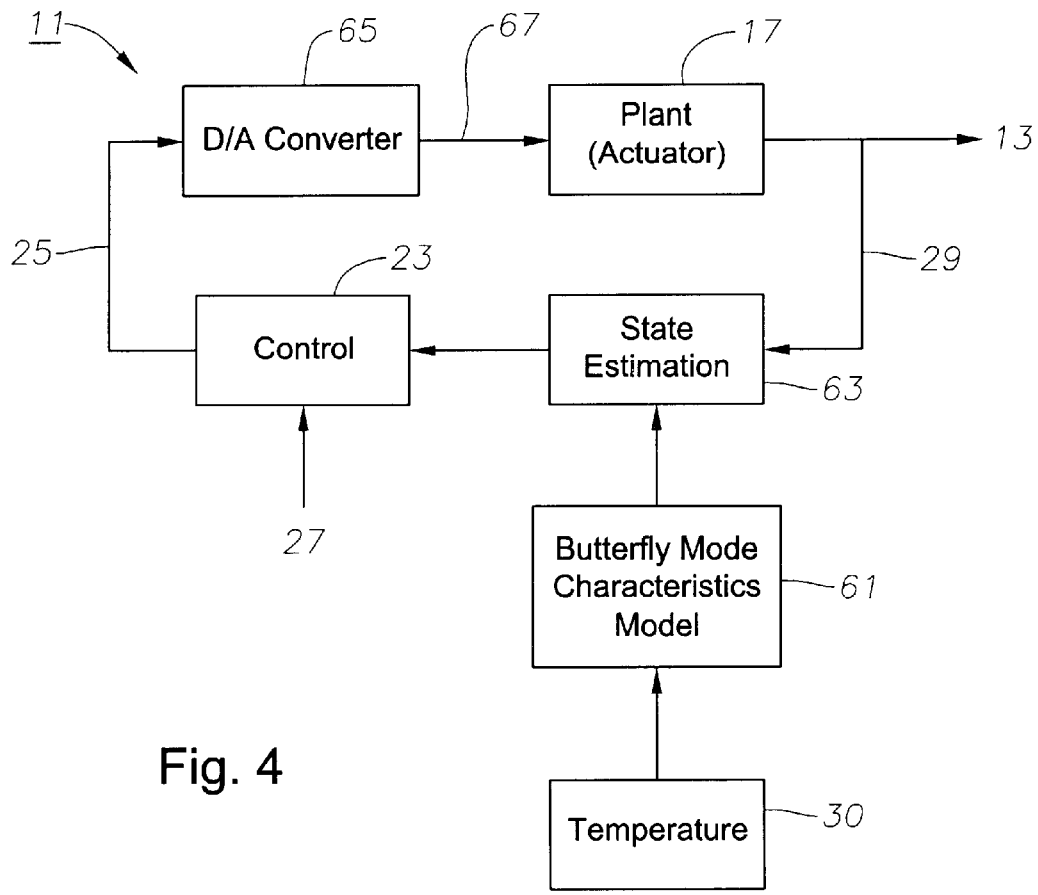
Fig. 4

VIBRATION MODE COMPENSATION FOR DISK DRIVE

CROSS-REFERENCE TO RELATED APPLICATIONS

The U.S. patent application entitled "Servo System Responsive to Temperature Changes", Ser. No. 09/303,912, filed May 3, 1999, and the U.S. patent application entitled "Adaptive Servo Estimator and Compensator for Coil and Carriage Deformation and Voice Coil Motor Driven Hard Disk Drive", filed concurrently herewith, are incorporated herein by reference.

BACKGROUND OF THE INVENTION

1. Technical Field

This invention relates in general to disk drive vibration modes, and in particular to an apparatus and method for compensating for the thermal sensitivity of the fundamental vibration mode of a disk drive.

2. Description of the Related Art

Generally, a digital data storage system consists of one or more storage devices that store data on storage media such as magnetic or optical data storage disks. In magnetic disk storage systems, a storage device is called a hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, two or three platters are stacked vertically on a common spindle that is turned by a disk drive motor at several thousand revolutions per minute (rpm).

The only other moving part within a typical HDD is the head assembly. Within most drives, one read/write head is associated with each side of each platter and flies just above or below the platter's surface. Each read/write head is connected to a semi-rigid arm apparatus which supports the entire head flying unit. More than one of such arms may be utilized together to form a single armature unit.

Each read/write head scans the hard disk platter surface during a "read" or "write" operation. The head/arm assembly is moved utilizing an actuator which is often a voice coil motor (VCM). The stator of a VCM is mounted to a base plate or casting on which is mounted a spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the read/write head nears the desired track, a reverse polarity signal is applied to the actuator, causing the signal to act as a brake, and ideally causing the read/write head to stop directly over the desired track.

Modern HDD throughput and storage capacity have been substantially increased by improvement in actuator design which has resulted in increased precision and speed in head placement. The more precisely the actuator can place the read/write head, the greater the drive track density. The term "servo bandwidth" will be utilized hereinafter to denote the cross-over frequency of an open loop transfer function applied to head positioning systems. As the track densities of HDDs increase, a high servo bandwidth is required to improve the TMR performance. Mechanical resonance of the coil and carriage is one of the dominant factors that limit the servo bandwidth of a voice coil driven HDD.

The demand for increased speed and storage capacity has resulted in ever faster and more compact hard disk drive (HDD) assemblies. Modern disk drives typically have several stacked disks that spin on a shaft at speeds exceeding 10,000 rpm. The track densities on these disks are often more than 12,000 tracks per inch (tpi). As the track density of HDDs increases, a high servo bandwidth is required to improve the efficiency of read/write operations as measured by Track Measurement Registration (TMR) as well as other performance indicators.

It would therefore be desirable to provide an improved method and system for minimizing the contribution of dynamic mechanical deformation of a HDD suspension and head apparatus to the off-track position error of read/write heads in a digital recording system. If implemented, such a system would serve to increase the servo bandwidth and thus the effective track density of a HDD assembly.

The fundamental vibration mode of disk drive actuators, frequently called the "butterfly" mode, is known to limit the servo bandwidth of disk drives. In the prior art, techniques exist in servo control to compensate for this mode and improve the bandwidth and, thus, the performance of the disk drive. One such technique assumes knowledge of the butterfly mode (i.e. its magnitude and frequency) and mathematically compensates for it in the controller algorithm.

The dynamic characteristics of the butterfly mode, such as frequency and damping, may be determined by several methods. The average values can be determined for a population of disk drives through direct measurement, or the parameters of each drive can be physically measured when it is manufactured so that the compensation for each drive is customized. However, the butterfly mode characteristics are known to be a strong function of temperature. Therefore, if the modal characteristics change due to a temperature change in the drive, the servo controller can no longer correctly compensate for the mode. The inability of a servo controller to adapt to thermal variations can lead to lower performance in the disk drive. Thus, an improved apparatus and method for compensating for the thermal sensitivity of the fundamental vibration mode of a disk drive is needed.

SUMMARY OF THE INVENTION

The fundamental vibration or butterfly mode sensitivity of a hard disk drive is significantly dependent on the operating temperature of the drive. The temperature of the drive is readily determined via measurement with a thermal or coil resistance sensor. The sensor provides the drive's servo controller with the drive temperature. The current operating temperature of the disk drive, in combination with its modal sensitivity to thermal changes, is used to regularly update the servo controller. With this information, the servo controller calculates new butterfly mode characteristics as the operating temperature changes in order to actively compensate for the mode and thus increase the performance of the disk drive.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 3 is a graph of the change in fundamental vibration mode as a function of temperature for the disk drive assembly of FIG. 1.

FIG. 4 is a block diagram of a servo control loop for the disk drive assembly of FIG. 1.

DETAILED DESCRIPTION OF ILLUSTRATIVE EMBODIMENT

Figure 1:
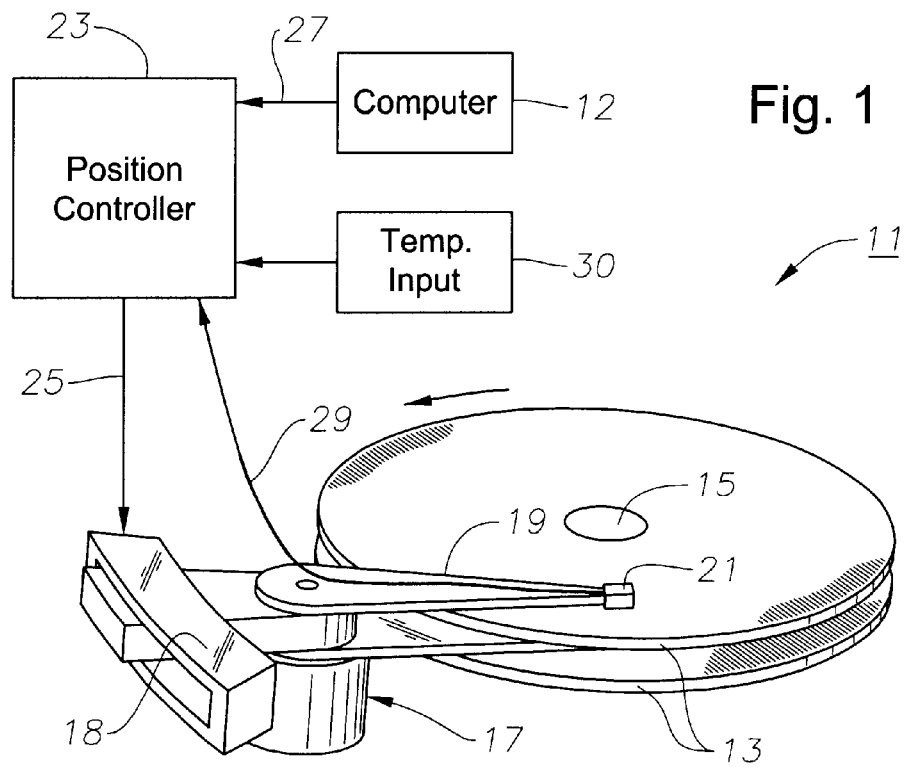
FIG. 1 is a schematic diagram of a disk drive assembly constructed in accordance with the invention.

Referring to FIG. 1, a disk drive 11 for a computer 12 has a plurality of magnetic disks 13 with read/write tracks. Disks 13 rotate on a central hub 15. Drive 11 uses a pivotable actuator 17 with a motor coil 18 and movable arms 19 having magnetic heads 21 on their distal ends. Arms 19 provide the seek motion when changing tracks on disk 13. A servo position controller 23 operates actuator 17 with a control signal 25 in response to an input target signal 27 from computer 12. Position controller 23 receives positional feedback information from actuator 17 through a position readback signal 29. Drive 11 also has a temperature sensor 30 for sensing its operational temperature. Sensor 30 may comprise any of a number of temperature detection devices including a thermocouple or a sensor for measuring the resistance of the coil 18 in disk drive 11 to determine the operating temperature of drive 11.

Figure 2:
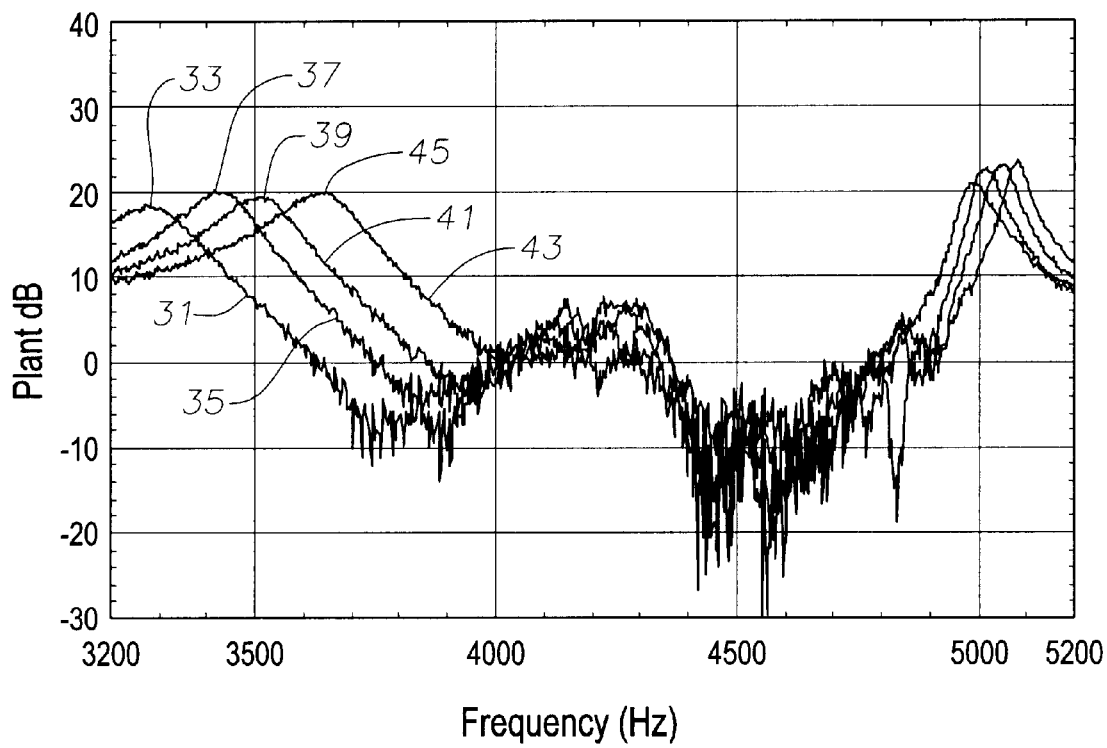
FIG. 2 is a series of plots depicting the thermal sensitivity of the fundamental vibration mode for the disk drive assembly of FIG. 1.

Referring now to FIG. 2, a series of empirically derived plots shows the plant transfer function of disk drive 11 as a function of temperature. The vertical axis of FIG. 2 is a magnitude of magnetic head off-track displacement decibel scale and the horizontal axis represents the frequency (Hz) of the control current. The sensitivity of disk drive 11 to changes in its operating temperature significantly affects the frequency of its fundamental vibration or "butterfly" mode.

Plot 31 of FIG. 2 illustrates the plant transfer function of drive 11 while operating at a temperature of 55 degrees C. At this temperature, the butterfly mode 33 of drive 11 is approximately 3280 Hz. When the operating temperature of drive 11 is decreased to 40 degrees C. (plot 35), the butterfly mode 37 of drive 11 increases to about 3430 Hz. At a temperature of 25 degrees C. (plot 41), the butterfly mode 39 of disk 11 is approximately 3520 Hz. At the relatively cool temperature of 10 degrees C., plot 43 shows that drive 11 has a butterfly mode 45 of about 3650 Hz.

Referring now to FIG. 3, the slope 51 of the change in butterfly vibration mode for drive 11 as a function of temperature is illustrated. The vertical axis is a scale for change in frequency and the horizontal axis depicts the operating temperature of drive 11. Slope 51 is approximately −6.78 Hz/degree C.

As shown in the block diagram of FIG. 4, the preferred embodiment of drive 11 uses a temperature sensor 30 to measure its drive operating temperature and provide input for its butterfly mode characteristic model 61. Model 61 is specifically calibrated for drive 11 based on its performance described in the previous figures. When this information is combined with the position feedback signal 29 from actuator 17, a very precise state estimation 63 is formed and used by position controller 23 to generate control signal 25. Control signal 25 is converted by a digital/analog converter 65 to the proper control current 67 and frequency prior to being received by actuator 17. Thus, drive 11 uses an active state space controller technique rather than a passive filtering technique as described in U.S. patent application Ser. No. 09/303,912, referenced above.

The invention has several advantages. The servo controller in the disk drive actively compensates for changes in the butterfly mode due to changes in operating temperature of the drive. These compensations increase the performance and reliability of the disk drive by stabilizing the servo.

While the invention has been shown or described in only some of its forms, it should be apparent to those skilled in the art that it is not so limited, but is susceptible to various changes without departing from the scope of the invention.

What is claimed is:

1. A hard disk drive for a computer system, comprising:
   a rotatable magnetic media;
   a pivot actuator having a motor coil with a movable arm, and a slider on an end of the arm for reading and writing information to the magnetic media;
   a servo controller for controlling the motion of the actuator;
   a sensor for detecting an operating temperature of the disk drive and providing the operating temperature to the servo controller; and wherein
      the servo controller utilizes the operating temperature and a fundamental vibration mode characteristics model for the disk drive to selectively empower and stabilize the actuator during operation of the disk drive.

2. The disk drive of claim 1 wherein the servo controller utilizes an active state space controller technique to control electrical current supplied to the actuator.

3. The disk drive of claim 1 wherein the sensor is a thermocouple.

4. The disk drive of claim 1 wherein the sensor measures the resistance of the motor coil to determine the operating temperature of the disk drive.

5. A hard disk drive for a computer system, comprising.
   a rotatable magnetic media;
   a pivot actuator having a motor coil with a movable arm, and a slider on an end of the arm for reading and writing information to the magnetic media;
   a servo controller for controlling the motion of the actuator;
   a sensor for detecting an operating temperature of the disk drive and providing the operating temperature to the servo controller;
   a fundamental vibration mode characteristics model for the disk drive; and wherein
      the servo controller utilizes and responds to changes in the operating temperature and an active state space controller technique that is based on the fundamental vibration mode characteristics model for the disk drive to control and change electrical current supplied to the actuator in order to stabilize the actuator during changes in the operating temperature of the disk drive.

6. The disk drive of claim 5 wherein the sensor is a thermocouple.

7. The disk drive of claim 5 wherein the sensor measures the resistance of the motor coil to determine the operating temperature of the disk drive.

8. A method for stabilizing a hard disk drive in a computer system, comprising:
   (a) providing a disk drive with magnetic media, an actuator having a motor coil with a movable arm, a slider on the arm for reading and writing information to the magnetic media, a servo controller for controlling motion of the actuator, and a fundamental vibration mode characteristics model for the disk drive;

(b) sensing a change in an operating temperature of the disk drive, calculating new fundamental mode characteristics as the operating temperature changes, and providing it to the servo controller; and then (c) selectively empowering the actuator with the servo controller based on the operating temperature and the fundamental vibration mode characteristics model for the disk drive in order to actively compensate for the new fundamental mode characteristics, stabilize the actuator, and increase performance during operation of the disk drive.

9. The method of claim 8 wherein step (c) comprises controlling the frequency of electrical current supplied to the actuator with an active state space technique.

10. The method of claim 8 wherein step (b) comprises detecting the operating temperature of the disk drive with a thermocouple.

11. The method of claim 8 wherein step (b) comprises detecting the operating temperature of the disk drive by measuring the resistance of the motor coil.

12. A method for stabilizing an actuator in a hard disk drive in a computer system, comprising:

(a) providing a disk drive with magnetic media, an actuator having a motor coil with a movable arm, a slider on the arm for reading and writing information to the magnetic media, a servo controller for controlling motion of the actuator, and a fundamental vibration mode characteristics model for the disk drive;

(b) sensing an operating temperature of the disk drive and providing it to the servo controller;

(c) controlling the frequency of electrical current supplied to the actuator with the servo controller by utilizing the operating temperature and an active state space technique that is based on the fundamental vibration mode characteristics model for the disk drive in order to stabilize the actuator during operation of the disk drive;

(d) changing the operating temperature of the disk drive to a different temperature; and (e) changing the frequency of electrical current supplied to the actuator with the servo controller by utilizing the different temperature and the active space state technique in order to stabilize the actuator at the different temperature.

13. The method of claim 12 wherein step (b) comprises detecting the operating temperature of the disk drive with a thermocouple.

14. The method of claim 12 wherein step (b) comprises detecting the operating temperature of the disk drive by measuring the resistance of the motor coil.

* * * * *